July 9, 1935.  H. DREYFUS  2,007,392
MANUFACTURE OF FILMS AND FOILS
Filed Jan. 11, 1933
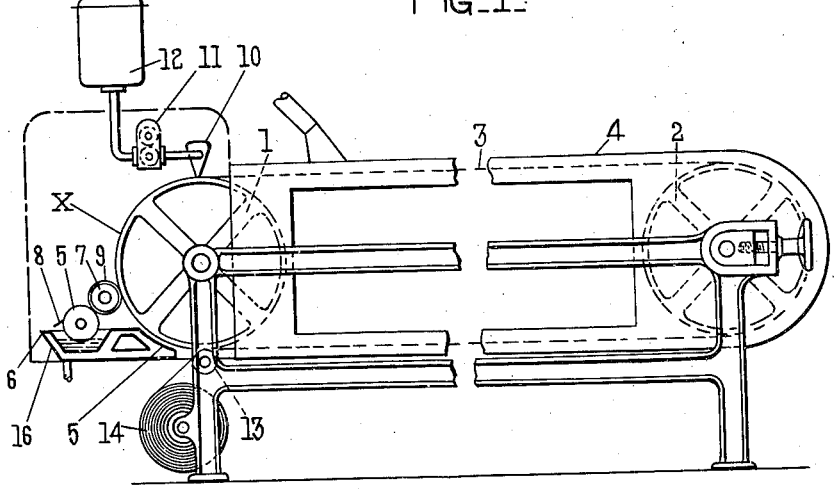
FIG_1_
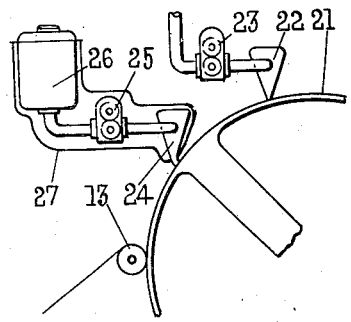
FIG_3_
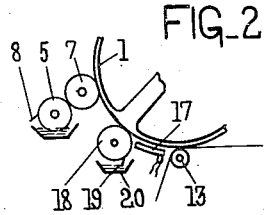
FIG_2_
HENRY DREYFUS
INVENTOR
ATTORNEYS Patented July 9, 1935

2,007,392

UNITED STATES PATENT OFFICE 2,007,392

MANUFACTURE OF FILMS AND FOILS

Henry Dreyfus, London, England

Application January 11, 1933, Serial No. 651,234
In Great Britain January 30, 1932

8 Claims. (Cl. 18—57)

This invention relates to the manufacture of artificial materials, and in particular to the manufacture of artificial films or foils, especially of thin foils suitable for use as wrapping paper, electrical insulation or other purposes.

The manufacture of such foils is effected by depositing a thin layer of a solution of the base material of the foil in any suitable solvent liquid on to a smooth surface, causing the thin layer to set and thereafter stripping the foil from the surface. Setting of the solution may be effected either by evaporation or by coagulation, the former usually being resorted to where the base material of the foil consists of cellulose acetate, cellulose nitrate or other derivatives of cellulose such as other esters of cellulose or cellulose ethers, and the latter, the wet method, being usually employed where the foil is of a cellulosic character, in which case the solution is generally in the form of viscose.

The smooth surface on to which the layer of solution is deposited is generally either in the form of a wheel or drum or an endless metal, paper, or other band, the drum or band moving continuously through the setting medium so that production of the foil forms a continuous operation. The layer is deposited on the moving surface at any point in its path, and is carried thereby through the setting medium to the point at which stripping takes place, generally near to the depositing point so as to use to the full length or periphery of the surface as a setting run.

It will be readily understood that apart from the manner in which the layer is deposited on the smooth surface, the quality of the product, and in particular its appearance, depends to a very large extent upon the nature of the surface itself. For instance, it is generally desirable, particularly where the foil is intended for use as a wrapping material, in which case transparency is usually regarded as important, to produce a material whose surface is as smooth and even as possible so as to impart a fine glossy appearance to the product. Since, however, one face of the foil is formed in intimate contact with the surface on which the solution has been deposited, this surface partakes exactly of the configuration of the surface, so that any irregularities found thereon are exactly reproduced. In the case of transparent foil in particular any such irregularities detract appreciably from the value of the foil. In addition, variations in the evenness of the surface may affect to some extent the thickness of the product which, apart from causing diminution in the strength of the material and its permeability to moisture and requiring a greater weight of material than is necessary for the desired strength etc., may also reduce its good appearance on account of the tendency to produce waves or cockles in the material.

It will be seen, therefore, that it is particularly important to employ a surface which is as smooth and even as possible in order to reduce to a minimum irregularities of the foil arising from this source. It is not, however, a matter of very great difficulty to produce a surface which for a time at least possesses great smoothness, but further difficulty arises because of the rapidity with which this smoothness is generally lost, especially where the surface consists of relatively soft material, but even in the case of surfaces consisting of hard material such as plated metals or metals having a hard surface and capable of receiving a high gloss, it happens that the continued wear on the surface arising from the continuous stripping therefrom of the set foil reduces in time the high polish, and renders the surface incapable of yielding a product of very high quality.

The object of the present invention is to prevent or overcome the difficulties attendant upon imperfections or damage to the surface on which the foil is to be formed.

According to the invention there is formed upon the surface a layer of material incompatible with the material forming the basis of the foil, this layer being of a temporary character and forming the actual depositing surface for the solution. The layer may not only improve the smoothness and finish of the foil, but also facilitate the stripping of the set foil from the surface, which is important where the foil is of a comparatively fragile character.

Since the material does not form a permanent part of the support on to which the foil-forming solution is laid, the layer need not possess any great degree of permanency. In fact, provided it maintains its smoothness of surface for such time as will suffice for the foil to set with a smooth surface, the layer of material has achieved its main object. Further, since it is usual for the supporting surface to move in a closed path to receive again and again a layer of solution, it becomes possible to renew the layer of material in order continually to present a surface having sufficient smoothness. One aspect of the invention, therefore, relates to such renewal of the surface. Conveniently this may be effected at each cycle of movement of the foil support, that is to say at each revolution of a supporting wheel, or once in each circuit of an endless band.

As above stated, the layer of material which provides the depositing surface proper is such as to be incompatible with the base of which the foil is formed. It may be, however, that the mere mechanical action of stripping or tearing the foil from the surface removes minute particles of the surface so as to render the surface not so well suited for the production of a perfect foil. Renewal of the layer prior to the further deposit of foil-forming solution avoids any trouble due to this cause. It is advisable, however, to see that the material is not only incompatible with the foil base, but also is substantially insoluble in the solvent employed in the solution. Examples of materials having these properties are carnauba wax, Montan wax, ceresin wax, ozokerite wax, beeswax, japan wax, and paraffin wax, which substances are insoluble or substantially so in the acetone solutions usually employed in the dry-spinning of cellulose acetate foils. These materials may be used alone or two or more may be suitably mixed together.

Renewal of the layer of material may be effected either by complete or partial removal of the material which has already served in the setting of a length of foil and the deposit of a new layer, by a further deposit of the material on a used layer, or by the reconstitution of the surface of a used layer together, if desired, with a further deposit of material. Thus, for example, a layer of wax may be removed by means which do not impair the surface of the support proper so as to free the surface from wax prior to the deposit of a new layer of material. For example, the wax may be melted from the surface by the suitable application of heat. Or again, a layer of wax may be subjected to the action of heat so as to melt the layer for the purpose of evening the surface and removing any blemishes occasioned in the foil-forming operation. Or again, further material may be deposited on to the surface of the used layer, which layer may already have been subjected to the action of heat to remove blemishes. Since, however, the deposit of the layer of wax is most conveniently effected by applying the wax in a molten condition, the heat thus employed may be used to even the surface of the layer of wax to which a further layer is being applied.

Any convenient means may be used to apply the layer of material on to the wheel, band or other support. The applying means should, however, be capable of applying the layer in as regular a manner as possible in order to produce the best possible surface on which the foil-forming solution is deposited.

The accompanying drawing shows by way of illustration several forms of apparatus according to the invention, Fig. 1 being a diagrammatic elevation of a band machine; Fig. 2 a view of a modified detail of Fig. 1; and Fig. 3 a view of part of a drum machine.

One form of apparatus for depositing the wax layer upon the support comprises a roller whose length extends over the width of the support and which is arranged to transfer a layer of the molten wax to the support. This form of apparatus is shown in Fig. 1 as applied to a band machine comprising drums 1, 2 for carrying the endless band 3 and a drying casing 4.

The wax layer is formed by causing a furnisher roller 5 to dip into a trough 6 containing molten wax transferring the wax to a depositor roller 7, the precise quantity of wax to be picked up preferably being regulated by means of a doctor blade 8. The depositing roller may be made of or surfaced with resilient material, such as rubber, as shown at 9 for the purpose of ensuring even transfer of the material from the roller to the band. Alternatively or in addition the roller may be resiliently mounted and pressed against the band, further particulars of such depositing means being given in U. S. application S. No. 651,161 filed January 11, 1933.

After the deposit of the wax, cooling brings about setting of the layer. As shown in the drawing sufficient run is provided on the drum 1 to enable the temporary surface to set prior to the deposit of foil-forming solution.

The applying means for depositing the foil solution, e. g. of cellulose acetate in acetone, comprises a hopper or casting box 10 arranged to feed a requisite quantity of solution to the band 3. This quantity may be determined simply by using a slit to determine the width and relying on the action of gravity to feed the solution to the slit. If necessary, as with solutions of high viscosity, e. g. 33% cellulose acetate solutions in acetone, forced feed may be used, preferably using a pump whose output is accurately controlled. Thus the pump may be of the measuring pump type employing toothed gears as shown at 11 which serves to deliver a regular quantity of solution from a gravity supply 12 or other supply means to the slit.

Though roller-depositing means are shown in the drawing for the application of the wax layer, it will be understood that other means may be employed for this purpose. For example, a hopper type of depositor similar to that described for the deposit of the cellulose acetate solution may be arranged to apply the wax at about the point X, as will be apparent to those skilled in the art.

As shown in the drawing, stripping of the foil from the band takes place at the roller 13, the foil being wound on the roll 14. Heating means 15 are arranged in proximity to the drum 1 immediately after the stripping roller 13 to soften and smooth the wax layer adhering to the drum. As shown, the heating means 15 comprises a steam-heated chamber close to the periphery of the drum and conveniently forms part of the jacket 16 by which the wax is maintained molten in the trough 6. It will be understood, however, that other suitable heating means, e. g. electrical means, may be used. After softening of the wax, the layer is reconstituted by the roll 7 and after setting is ready to receive further acetate solution.

Fig. 2 shows means for stripping the wax layer prior to the application of fresh wax. A heater 17 arranged immediately after the stripping roller 13 softens the wax and enables it to be removed from the band 1 by a roll 18 of rubber or other material which will not damage the surface of the band. A doctor blade 19 removes the wax from the roll 18 and discharges it into a trough 20. A new layer is then applied as previously described by the roll 7.

In Fig. 3 is shown the application of a wax layer to a drum machine prior to deposit of the foil-forming solution. The solution is applied to the drum 21 by means of a hopper 22, fed by a pump 23, the drum moving clockwise. In advance of the hopper is arranged a wax-depositing hopper 24 containing molten wax and adapted to apply a layer of desired thickness. This hopper may be supplied by a pump 25 from a container 26, a heating jacket 27 being provided to maintain the wax molten. Setting of the wax takes place between the hopper 24 and the solution-applying hopper 22.

It will be understood that where the foil-forming operation is carried out by the evaporative method, as for example in the apparatus illustrated, the material should be capable of standing up to the temperature employed to procure the evaporation of the solvent from the solution. This is particularly important where wax is used to form the layer of material, and care should be taken to choose a wax whose melting point is sufficiently high to ensure that the layer does not melt or appreciably soften during the setting of the foil. The waxes enumerated above have the following melting points, which are high enough to permit most of them to be safely employed for the dry-spinning of foils from cellulose acetate solutions in acetone:—paraffin wax 53.5° C., ceresin 68.7° C., ozokerite wax 64° C., caranauba wax 85° C., beeswax 65° C., japan wax 52° C. and Montan wax 80–86° C.

What I claim and desire to secure by Letters Patent is:—

1. In the manufacture of films and foils by the deposit of a film or foil-forming solution on to a support, the step of continuously applying to the support, prior to depositing the solution, a thin layer of a rapidly solidifying material incompatible with the material in solution, to form a solid temporary non-strippable surface for the support to receive said solution.

2. In the manufacture of films and foils by the deposit of a film or foil-forming solution on to a support, the step of continuously applying to the support, prior to depositing the solution, a thin layer of wax, the wax being incompatible with the material in solution, to form a temporary surface to receive said solution.

3. Method of continuously manufacturing films and foils comprising depositing a thin layer of wax on a support to form a temporary surface therefor, depositing a film or foil-forming solution on to said layer, causing the solution to set under the application of heat, stripping the film or foil thus formed from the support, the wax having such a melting point that it does not appreciably soften in the operation, and reconstituting said wax layer prior to further deposit of solution.

4. Method of continuously manufacturing films and foils which comprises forming a thin, non-strippable layer on a support to form a temporary surface for said support, depositing a film- or foil-forming solution upon said layer, the layer consisting of a rapidly solidifying material incompatible with the material in solution, causing the solution to set, stripping the film or foil thus formed from the support and then, prior to further deposit of solution, at least partially removing said layer from said support and forming a new layer of said rapidly solidifying material thereon.

5. Method of continuously manufacturing films and foils which comprises depositing a thin layer of wax on a support to form a temporary surface therefor, depositing a film- or foil-forming solution upon said layer, the wax being incompatible with the material in solution, causing the solution to set, stripping the film or foil thus formed from the support and then, prior to further deposit of solution, at least partially removing said wax layer from said support and depositing a new layer of wax thereon.

6. Method of continuously manufacturing films and foils which comprises depositing a thin layer of wax on a support to form a temporary surface therefor, depositing a film- or foil-forming solution upon said layer, the wax being incompatible with the material in solution, causing the solution to set, stripping the film or foil thus formed from the support and then, prior to further deposit of solution, heating the support to at least partially remove the wax layer therefrom and depositing a new layer of wax thereon.

7. Method of continuously manufacturing films or foils which comprises depositing a thin layer of wax on a support to form a temporary surface therefor, depositing a solution of an organic derivative of cellulose in a volatile solvent upon said layer, the wax being incompatible with the organic derivative of cellulose and with the solvent, causing the solution to set, stripping the film or foil thus formed from the support and then, prior to further deposit of solution, at least partially removing said wax layer from said support and depositing a new layer of wax thereon.

8. Method of continuously manufacturing films or foils which comprises depositing a thin layer of wax on a support to form a temporary surface therefor, depositing a solution of cellulose acetate in acetone upon said layer, the wax being incompatible with the cellulose acetate and with the acetone, causing the solution to set, stripping the film or foil thus formed from the support and then, prior to further deposit of solution, at least partially removing said wax layer from said support and depositing a new layer of wax thereon.

HENRY DREYFUS.